United States Patent
Chapman et al.

(10) Patent No.: US 9,258,149 B2
(45) Date of Patent: Feb. 9, 2016

(54) REFINEMENT OF CHANNEL RESPONSE CALCULATION

(75) Inventors: James Chapman, Cambridge (GB); Jason Taylor, Godalming (GB); Cyril Valadon, Letchworth (GB)

(73) Assignees: MStar Semiconductor, Inc. (KY); MStar Software R&D (Shenzhen) Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 1782 days.

(21) Appl. No.: 11/662,302

(22) PCT Filed: Sep. 9, 2005

(86) PCT No.: PCT/GB2005/003489
§ 371 (c)(1),
(2), (4) Date: Oct. 4, 2007

(87) PCT Pub. No.: WO2006/027607
PCT Pub. Date: Mar. 16, 2006

(65) Prior Publication Data
US 2008/0130730 A1    Jun. 5, 2008

(30) Foreign Application Priority Data

Sep. 10, 2004 (GB) .................................. 0420179.4
Feb. 14, 2005 (GB) .................................. 0503036.6

(51) Int. Cl.
*H03H 7/30* (2006.01)
*H03H 7/38* (2006.01)
*H04L 25/02* (2006.01)

(52) U.S. Cl.
CPC ................................ *H04L 25/0218* (2013.01)

(58) Field of Classification Search
USPC ......... 370/290–292, 341, 357–360, 431, 437, 370/464, 465, 537, 534, 538; 455/225, 455/226.1–226.3, 176.1, 179.1, 178.1, 455/180.1, 166.2, 103, 105, 500, 501, 515; 375/262, 211, 219–222, 229–236, 375/240.26–240.29, 265, 278, 284, 285, 375/295, 296, 316, 340–343, 346
See application file for complete search history.

(56) References Cited

U.S. PATENT DOCUMENTS

| | | | |
|---|---|---|---|
| 5,251,233 A | 10/1993 | Labedz et al. | |
| 5,687,198 A | 11/1997 | Sexton et al. | |
| 7,301,993 B2 * | 11/2007 | Ibrahim et al. | 375/152 |
| 7,321,646 B2 * | 1/2008 | Arslan et al. | 375/346 |
| 2003/0081668 A1 * | 5/2003 | Yousef et al. | 375/232 |
| 2003/0165132 A1 | 9/2003 | Che-Li et al. | |
| 2004/0174940 A1 | 9/2004 | Kim et al. | |
| 2005/0036541 A1 * | 2/2005 | McKown | 375/233 |
| 2005/0135509 A1 * | 6/2005 | Mantravadi et al. | 375/340 |

FOREIGN PATENT DOCUMENTS

| | | |
|---|---|---|
| DE | 43 29 317 A1 | 3/1995 |
| EP | 0 691 770 A2 | 1/1996 |
| EP | 0 935 372 A2 | 8/1999 |

(Continued)

*Primary Examiner* — Linda Wong
(74) *Attorney, Agent, or Firm* — Edell, Shapiro & Finnan, LLC

(57) ABSTRACT

A scheme for determining which of a set of taps that can potentially be used to measure a channel impulse response should be used to estimate the channel impulse response.

24 Claims, 7 Drawing Sheets

(56) References Cited

FOREIGN PATENT DOCUMENTS

| | | | |
|---|---|---|---|
| EP | 0 966 113 A1 | 12/1999 | |
| EP | 1 300 999 A1 | 4/2003 | |
| WO | WO 01/50694 A1 | 7/2001 | |
| WO | WO 02/09297 A2 | 1/2002 | |
| WO | WO 02/082683 A2 | 11/2002 | |
| WO | WO 03/103245 A1 | 12/2003 | |

\* cited by examiner

REFINEMENT OF CHANNEL RESPONSE CALCULATION

CROSS REFERENCE TO RELATED APPLICATIONS

This application is a national phase application based on International Application No. PCT/GB2005/003489, filed Sep. 9, 2005, which claims the priority of Great Britain Patent Application Nos. 0420179.4, filed Sep. 10, 2004, and 0503036.6, filed February 2005, the contents of all of which are incorporated herein by reference.

BACKGROUND OF THE INVENTION

In a typical radio system (see FIG. 1), information is modulated onto a radio carrier by a transmitter. This signal then travels via an unknown and changing environment to the receiver. The ability to remove the effects of the environment from the signal is often key to the performance of a receiver.

The effects of the environment are usually described by a radio channel, interference and noise. The noise arises from thermal noise in the environment together with circuit noise in the receiver. The interference arises from other users of the radio spectrum. The radio channel describes the effects of a multitude of propagation paths, each with potentially differing lengths and attenuations (see FIG. 2a).

The differing path lengths in the radio channel give rise to differing delays in sending signals between the transmitter and the receiver. This, in turn, yields a distribution in the received power when viewed against the delay (see FIG. 2b). This range of delays causes successive transmitted symbols to overlap at the receiver; a phenomenon known as inter-symbol interference (ISI). The primary purpose of the receiver is to remove this ISI in the presence of interference and noise thereby recovering the transmitted information (see 'Digital Communications', John G. Proakis, McGraw-Hill International Series, $3^{rd}$ Edition). Note that in a sampled system, the radio channel filter is sampled, as is the associated distribution of power against delay (see FIG. 2c).

In order to successfully remove the ISI, the receiver needs to estimate the radio channel. A poor channel estimate significantly degrades the performance of the receiver. Some receivers estimate the channel in an blind fashion (see 'Digital Communications', John G. Proakis, McGraw-Hill International Series, $3^{rd}$ Edition); however, many modern communications standards provide the receiver with known sequences of transmitted symbols from which the channel can more easily be estimated. Examples of such standards are GSM/GPRS and E-GPRS.

When estimating a radio channel from a sequence of symbols, whether known in advance or previously estimated in the receiver, a number of techniques may be used (see 'Channel estimation in narrowband communication systems', H. Arslan and G, Bottomley, Wireless Communications and Mobile Computing; 2001; vol. 1:201-219. Examples of such techniques include Least-Squares (LS) estimation and, for particular forms of symbol sequences, correlation.

When estimating the radio channel the presence of noise and interference degrade the accuracy of the estimate. In order to maximise the performance of the receiver this degradation should be kept to a minimum. One means of reducing the effects of noise and interference is to ensure that taps in the radio channel which are effectively zero are not estimated but are instead set to zero. By setting the taps to zero, error due to noise on those taps is removed. This effect has been previously documented (see U.S. Pat. No. 5,251,233).

Moreover, by only estimating the non-zero taps, the number of degrees of freedom in the estimation is reduced which in turn increases the suppression of noise and interference on the estimated taps.

BRIEF SUMMARY OF THE INVENTION

According to one aspect, the invention provides apparatus for estimating for a wireless signal acquired by a receiver a channel response estimate having a set of potential tap positions, the apparatus comprising measurement means for calculating signal significance values for said signal for all positions in the set, selecting means arranged to use signal significance values produced by the measurement means to determine if any of said positions should not be used to calculate the channel response estimate and estimation means for calculating the channel response estimate using said set less any positions excluded by the selecting means.

The invention also consists in a method of estimating for a wireless signal acquired by a receiver a channel response estimate having a set of potential tap positions, the method comprising a measurement step of calculating signal significance values for said signal for all positions in the set, a selecting step arranged to use signal significance values produced by the measurement step to determine if any of said positions should not be used to calculate the channel response estimate and an estimation step of calculating the channel response estimate using said set less any positions excluded by the selecting step.

This application describes a way of improving the quality of a radio channel estimate by only estimating those channel taps which contain significant signal. The channel estimation may be performed in a blind fashion. Alternatively it may be estimated by comparison with a known set of symbols. In some systems these symbols are obtained by previous action of the receiver; however, in many cases the symbols are deliberately placed within the transmitted signal specifically to aid the receiver in its calculation of the radio channel. Such symbols are frequently referred to as Training Sequences (TS), an example of which is contained within the radio burst used in GSM/GPRS/E-GPRS (see FIG. 3 and '3GPP TS 45.002—$3^{rd}$ Generation Partnership Project; Technical Specification Group GSM/EDGE; Radio Access Network; Multiplexing and Multiple Access on the Radio path.').

In certain embodiments, the invention estimates the distribution of signal significance against delay within the channel. This distribution varies with time under the influence of both fast and slow fading (see 'Microwave Mobile Communications', William C. Jakes—Editor, IEEE Press). Optionally, the distribution is filtered to yield sufficient accuracy in the estimate whilst still tracking significant time variations of the distribution. The estimated signal significance distribution is used to determine which taps in the radio channel are estimated whenever a new channel estimate is calculated. By only estimating those channel taps with significant signal, the number of degrees of freedom in the estimation problem is reduced thereby enhancing suppression of interference and noise in the channel estimate. As a corollary, by setting near zero taps explicitly to zero, the noise associated with these tap estimates is also removed. The improvement in the channel estimate obtained via use of the proposed invention leads directly to an improvement in the overall performance of the receiver.

According to another aspect, the invention provides apparatus for estimating for a wireless signal acquired by a receiver a channel response estimate having a set of potential tap positions, wherein the potential tap positions are treated as a vector and the apparatus comprises means for deducing a state of the vector that produces an acceptable value of an objective function having the vector as a parameter and means for calculating the channel response estimate using those of the potential tap positions that are specified by the deduced state.

The invention also consists in a method of estimating for a wireless signal acquired by a receiver a channel response estimate having a set of potential tap positions, wherein the potential tap positions are treated as a vector and the method comprises a step of deducing a state of the vector that produces an acceptable value of an objective function having the vector as a parameter and a step of calculating the channel response estimate using those of the potential tap positions that are specified by the deduced state.

BRIEF DESCRIPTION OF THE DRAWINGS

The invention can be realised by bespoke hardware or software using generic hardware or by some combination of both.

By way of example only, certain embodiments of the invention will now be described, in which.

DETAILED DESCRIPTION OF THE INVENTION

The following description frequently assumes that the information is transmitted in blocks of bits rather than as a continuous stream. It should be noted however that the proposed invention is applicable to both transmission formats.

Figure 1:
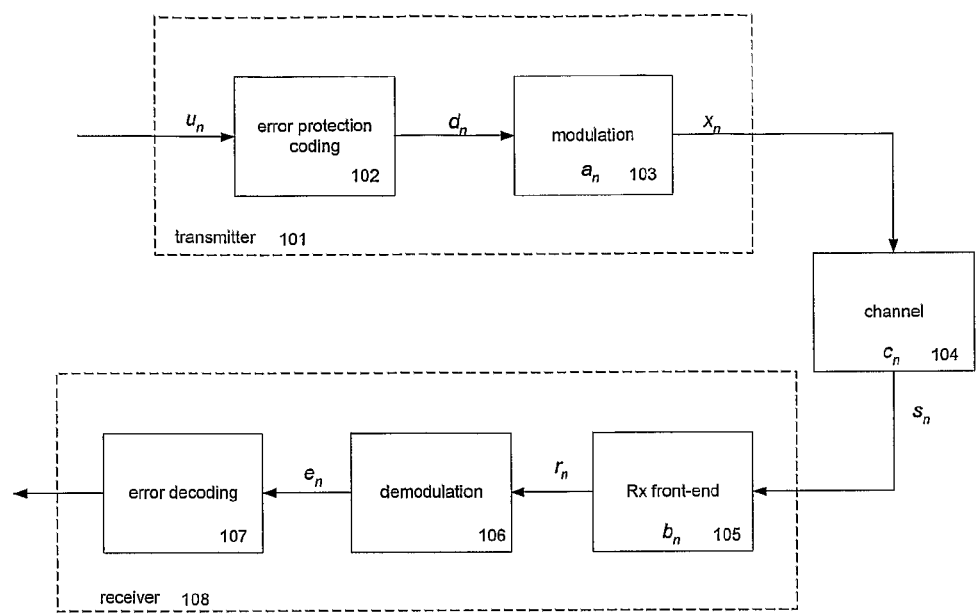
FIG. 1 presents the model of the communication link.

FIG. 1 shows the processing blocks that may be found in a typical digital radio system.

The transmitter 101 passes information bits through a block adding error protection coding 102 and then through a modulation block 103 which modulates the coded information onto a radio carrier. As part of the modulation, known symbols may be added to assist with radio channel estimation in the receiver.

Once transmitted, the radio signal then passes through the radio channel 104 before reception 108. This radio channel frequently gives rise to ISI which must then be removed by the receiver to ensure correct reception. Before being processed by the receiver blocks, the signal also acquires both interference and noise. The interference arises from other users of the spectrum whilst the noise is thermal noise from the environment. Additional noise is then added as the signal passes through the Rx front end 105.

The receiver 108 converts the analogue radio signal to a digital base band signal in the Rx front-end 105. The signal is then passed through the demodulation block 106. This serves to estimate the transmitted coded-bits in the presence of the ISI, interference and noise added by the radio channel and the Rx front end. The signal is then decoded 107 to yield the final received information bits.

Whilst frequently the radio channel, $c_n$ is the major source of ISI, it should be noted that any other filters in the signal path may serve to add ISI. In particular the Rx front end 105 will add ISI via its receive filtering, $b_n$. Certain transmit modulation schemes will also apply transmit filtering, $a_n$, which also adds ISI. One example of such a scheme is the 8PSK modulation in EDGE (see '3GPP TS 45.004 $3^{rd}$ Generation Partnership Project; Technical Specification Group GSM/EDGE; Radio Access Network'). The receiver needs to remove all sources of ISI in order to recover the signal correctly. In what follows, the combined filtering experienced by the signal is $h_n$ where:

$$h_n = \sum_{p,q} a_p c_{q-p} b_{n-q}.$$

In this system, the received signal, $$r_n = \sum_{m=0}^{J-1} h_m x_{n-m} + \eta_n,$$

where the combined filter experienced by the signal, h, has length J thus N transmitted symbols, x, define K=N−(J−1) received symbols, r. The noise and interference added to the signal are represented by $\eta$.

The received signal can also be represented in the following matrix form: r=Mh+η; where M is a K×J matrix of transmitted symbols, $M_{n,m} = x_{n-m+(J-1)}$, such that $m \mapsto \{0, \ldots, J-1\}$ and $n \mapsto \{0, \ldots, N-J\}$. Moreover, let $M^{TS}$ be the matrix formed from a set of known training symbols. These symbols may have been previously estimated by the receiver or they may have been specifically added by the transmitter 101 to aid the receiver in estimating the channel response.

Using the known training sequence the receiver can estimate the combined channel, h, in a number of ways (see 'Channel estimation in narrowband communication systems', H. Arslan and G, Bottomley, Wireless Communications and Mobile Computing; 2001; vol 1:201-219. One possible method is Least-Squares (LS) which gives the estimate of the channel, $\hat{h}$, as:

$$\hat{h} = (M^{TS^H} M^{TS})^{-1} M^{TS^H} r;$$

where $M^H$ indicates the hermitian transpose of M.

The estimation error variance is minimised when $M^{TS^H} M^{TS} = (N-(J-1))I$ where I is the identity matrix. This gives a mean square error in the estimate of the channel, $$MSE_{LS} = \left( \frac{\sigma_z^2}{N-(J-1)} \right) I$$

where $\sigma_z^2$ is the noise power assuming only Additive White Gaussian Noise (AWGN). In this case it is clear that reducing the number of channel taps estimated, J, reduces the error on the channel estimate thus improving the receiver performance. This is an example of a more general principle in which reducing the number of degrees of freedom to be estimated increases the accuracy of the estimate.

This embodiment aims to provide a method whereby the receiver identifies and ignores all channel taps that contain insignificant signal. This reduces the number of channel taps estimated, thus allowing the error on the channel estimate to be reduced. If the distribution of signal-significance has a span of M taps then this invention is able to determine L significant channel taps where L<M. This is in contrast to other methods for which L<M.

It will be clear to those skilled in the art that there are many measures of 'signal significance' which could be used. Once such measure is the amplitude of the tap. Another possible measure is the signal power in a given tap. Both of these measures could either be used in an absolute fashion or ratioed against a measure of the overall quality such as the total signal power or the noise power. In the following description power is used as a measure of a signal-significance. It will clear to those skilled in the art there is a number of similar embodiments of the invention which use different measures of signal significance.

Figure 2:
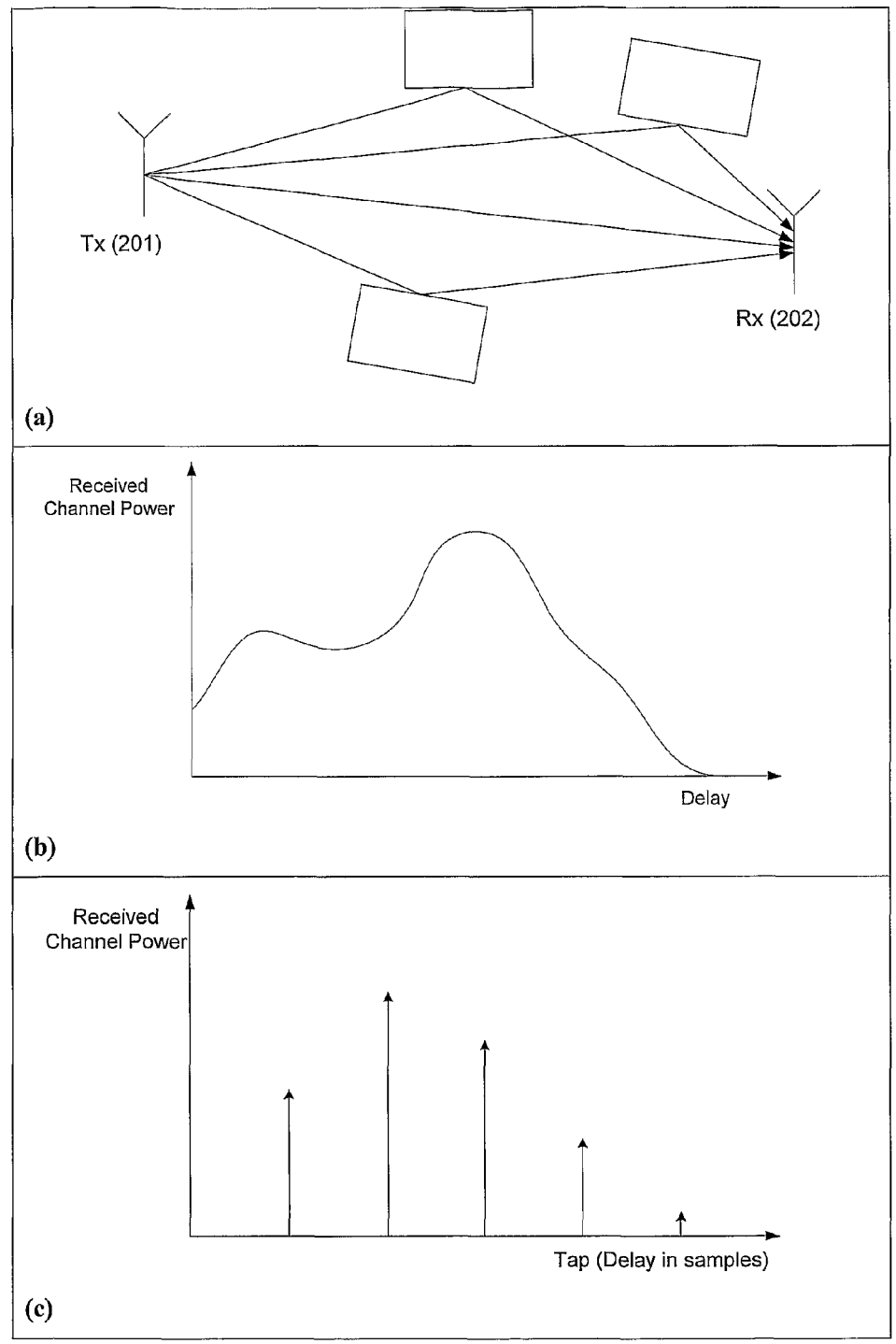
FIG. 2 illustrates how multiple radio propagation paths give rise to a distribution of received power against delay from transmitter: (a) shows multiple reflections giving different path lengths between transmitter and receiver; (b) shows a continuous distribution of received power with delay; (c) shows a sampled version of the received power with delay.
Figure 4:
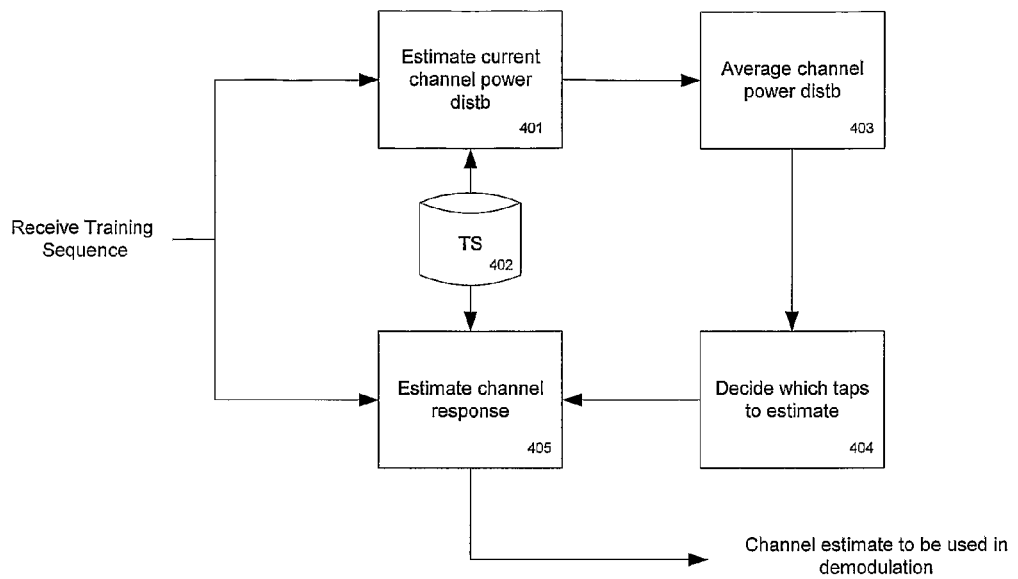
FIG. 4 presents one possible method for adaptively altering the number of estimated channel taps according to the channel conditions.

FIG. 4 shows a particular embodiment of the invention. In this particular embodiment, the portion of the received signal arising from the known training sequence is used as an input to the channel-power estimation block 401. This block uses the received data in conjunction with the known training sequence 402 to estimate the distribution of power with delay in the channel (see FIG. 2). The estimate is then used to update an average power distribution 403. Based on this average distribution, channel taps which have negligible power are identified 404. The non-negligible taps are then estimated 405 based on the received sequence and the known training sequence. The resulting channel estimate is then used in the remainder of the demodulation block 106.

In one embodiment of the invention the current power distribution 401 is estimated by first estimating the channel distribution over the maximum number of taps, $J_{max}$. The power in a given tap, $p_n$, is then estimated by taking the squared modulus, $p_n=|h_n|^2$. In certain systems the training sequence is designed to have good auto-correlation properties; for example, in GSM and E-GPRS, each training sequence of 26 symbols has 16 symbols such that the auto-correlation is zero for non-zero lags between −5 and 5. In this case, a reasonable estimate of the channel may be obtained by simply correlating the relevant section of the received sequence with the training sequence. The advantage of using such a correlation is that it can be implemented in an efficient manner. In the specific case of GSM/E-GPRS the nature of the training sequences allow channel estimates of length 6 symbols or less to be estimated without additional error arising from non-ideal auto-correlation properties. In practise it is possible to sustain some non-ideality in auto-correlation when estimating the power distribution. In particular it is possible to estimate distributions of $J_{max}=7$ taps without undue error.

The sequence of symbols used in the estimation of both the power distribution and the channel 402 may be specified within the communications system. An example of such a system is GPRS/E-GPRS in which the 26 symbols in the centre of the radio burst are pre-determined and are thus available to the receiver for use in estimating the channel (see FIG. 3).

Figure 3:
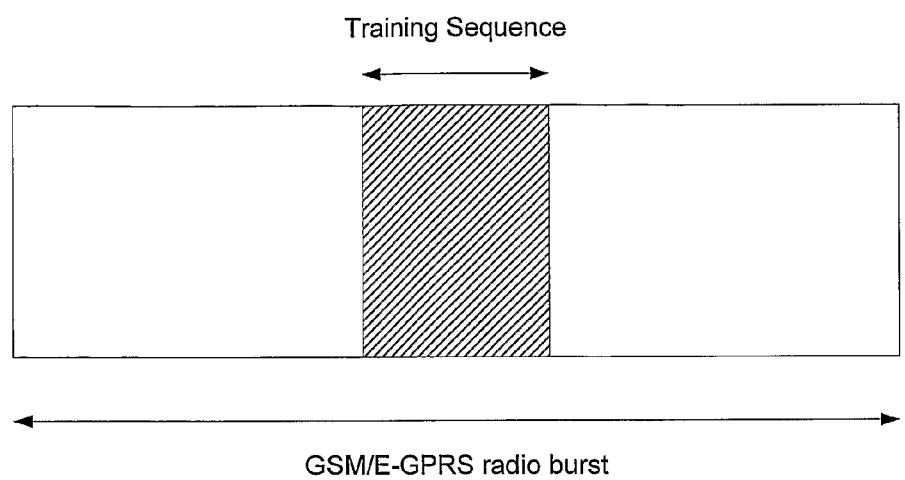
FIG. 3 shows a training sequence within a GSM/GPRS/E-GPRS radio burst.

In a further embodiment of the invention, the symbols used in the estimation of both the power distribution and the channel 402 may be calculated prior to the channel estimation by previous operations within the receiver 108. In one such embodiment a section of received data is demodulated and then used as a set of training symbols for a further iteration of the demodulation process. A particular example for GSM/EDGE is a two-pass demodulator. In the first pass the training symbols in the middle of the radio burst (see FIG. 3 are used as the training sequence (TS). In the second pass through the demodulator, a larger set of symbols is used, some of which were identified as a result of the first demodulation. Since the set of training symbols is larger on the second demodulation, the accuracy of the power distribution and power estimate is improved. It will be clear to those skilled in the art that a number of such iterative schemes is possible. In all cases an advantage is obtained by using symbols estimated in a previous iteration step as training symbols 402 in the current or successive steps.

Figure 5:
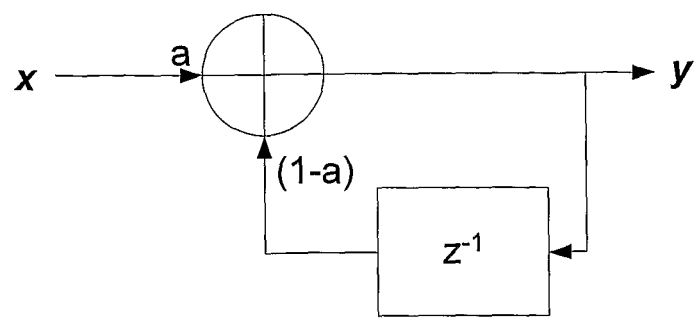
FIG. 5 presents one possible method for filtering the estimates of the channel power in a given tap. In this diagram the input raw estimates are x, and the outputs are y; the block marked $z^{-1}$ corresponds to a delay of one sample.

The power distribution with delay, estimated from a given sequence of training symbols 401, suffers corruption from noise, interference and other sources of estimation error. In order to lessen the effect of these errors, successive estimates of the power distribution are averaged 403. Those skilled in the art will appreciate that one means of providing an average for a given tap is to filter successive power estimates for that tap. In one embodiment, this filter has a finite impulse response (FIR). One example of such a filter is the simple running average filter. In another embodiment, the filter has an infinite impulse response (IIR). These filters have the advantage that they can be more efficiently implemented that FIR structures. One such IIR structure is shown in FIG. 5.

The power distribution with delay is continuously varying due to the effects of both fast and slow fading. In one possible embodiment, the averaging of the power distribution 403 is chosen so as to track the slow fading whilst averaging the fast fading. In the particular case when a first order IIR filter is used to perform the filtering (see FIG. 5) the 'forgetting factor', a, can be adjusted to alter the length of variations which the filter is able to track. In this case, increasing a allows the averaging block 403 to track faster variations. It will be clear to those skilled in the art that the nature of the optimum filter, both in terms of magnitude and phase response, will vary according to the communications system to which this invention is applied. In an embodiment applied to GSM/EDGE an IIR filter, applied so as to track the slow-fading, is found to give satisfactory results. In a further embodiment the filtering applied to the channel power distribution 403 is altered so as to adapt to a changing environment; for example, if the fading rate decreased the level of filtering could be increased (e.g. lower the forgetting factor a in FIG. 5 whilst still tracking the changing environment).

Figure 6:
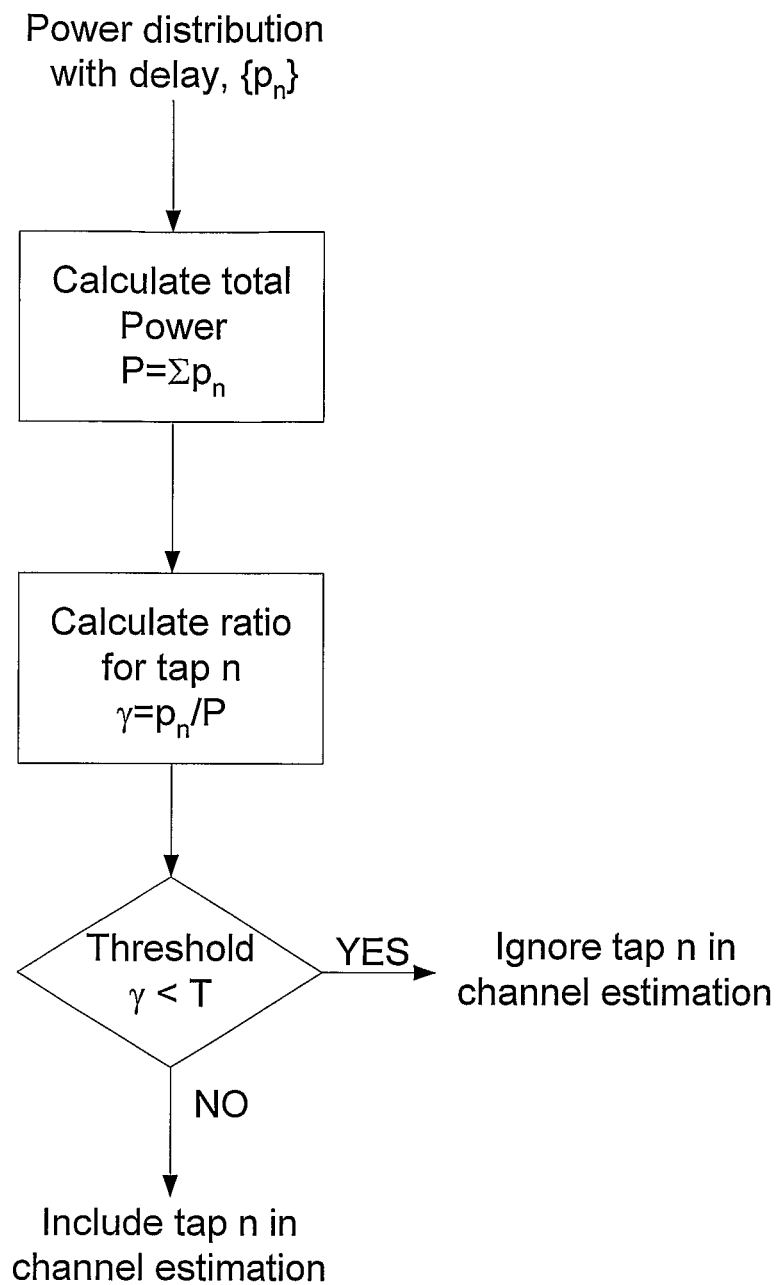
FIG. 6 presents one possible method for deciding which of channel taps to accurately estimate given the current estimate of the distribution of channel power with delay.

The average power distribution 403 is used within this embodiment of the invention to determine which of the channel taps to ignore 404 when performing the accurate channel estimation 405. There are a number of ways of determining which taps have sufficiently low power to ignore. In one embodiment the power in each tap of the average power distribution is compared with the total power in the distribution (see FIG. 6). When a tap is found whose power, as a percentage of the total, is lower than a threshold, that tap is subsequently ignored and assumed to be zero in the ensuing accurate channel estimation. The value of the threshold that optimises performance will vary with the system in which the invention is used. In one possible embodiment the threshold will be fixed, for example at 10%. In another embodiment the threshold may be adapted according to other parameters in the system, such as the level of averaging applied 403 which in turn may be varied according to the estimated fading rate.

In a further embodiment, the estimation process 405 is further simplified by only removing taps at the end of the channel. In this manner, rather than excising specific taps within the estimate, the estimate is simply shortened (or lengthened) depending on the average power distribution 403.

In a further embodiment of the invention the power in each tap 402 is ratioed against the noise, or error, associated with the tap to yield a signal to noise ratio (SNR) for each tap. This can then be used to decide which taps to ignore in accurate estimation of the channel; for example, those taps with an SNR below a given threshold (e.g. 0 dB) could be ignored. In this case there are a number of ways of estimating the noise. One way is to remodulate the known training symbols with the estimated channel and subtract this from the associated section of the received signal. This gives an estimate of the noise power on the signal, $\sigma_N^2$. This noise estimate can be further used to yield an estimate for the estimation error on the channel which could also be used in assessing the tap significance. For example, in the case of a correlation over M taps, the error power due to noise on the channel estimate will be $\sigma_N^2/M$.

When performing the accurate estimation of the channel 405 many possible methods are available to those skilled in the art (see 'Channel estimation in narrowband communication systems', H. Arslan and G, Bottomley, Wireless Communications and Mobile Computing; 2001; vol 1:201-219. In particular a MAP estimate may be used. In the particular case in which the channel coefficients are assumed, a priori, to be uncorrelated with equal strength, $\sigma_h^2$, the training sequence has ideal LS auto correlation properties and the noise is white with power, $\sigma_z^2$, the Mean Square Error matrix is:

$$MSE_{MAP} = \left( \frac{\sigma_h^2 \sigma_z^2}{(N-J+1)\sigma_h^2 + \sigma_z^2} \right) I.$$

Again, as the length of the channel being estimated, J, is reduced, the error in the estimate also reduces. This further serves to illustrate the principle which this invention seeks to exploit; namely that by reducing the number of degrees of freedom in an estimation problem the accuracy of the estimate is increased. As a corollary, the error associated with those taps that were judged to be insignificant, and hence were set to zero, is now no longer fed into the remainder of the demodulation process. This also helps to increase the overall performance of the receiver.

In the schemes thus far described, the decision for the inclusion of a given tap in the set of taps used in the channel estimation process is based on the signal significance measure associated with that particular tap. However, it is possible to take a joint decision on the inclusion of all the possible taps in the set of taps to be used for channel estimation. Some examples of such a "joint decision" approach will now be described.

Given the availability of a set of J taps for making a channel estimate, the decision whether to include the $k^{th}$ tap in the channel estimation process can be expressed as $i_k \in \{0,1\}$ where $i_k=1$ denotes that the channel tap with index k is included in the channel estimation and $i_k=0$ denotes that tap k is ignored during the channel estimation. Vector $i=(i_0, i_1, \ldots i_k, \ldots i_{J_{max}-1})$ represents the inclusion-exclusion decision for all taps.

The decision on which taps to be included in the channel estimation can be derived by maximising the value of an objective function (or equivalently minimising the objective function when the objective function is negatively correlated with the accuracy of the channel estimation). The selected set of decisions, denoted as $i_{max}$, can be derived using the following equation $$i_{max} = \arg \max_{i \in \{0,1,\ldots,2^{J_{max}-1}\}} (F(i))$$

In this proposed approach, all $2^{J_{max}-1}$ possible states of vector i are considered and the best possible state is selected. Moreover, in the evaluation of the objective function for each possible value of i, the signal significance associated with all the taps can be taken into account.

A number of different implementations of the objective function F(i) are possible and, by way of example, one such possible implementation is presented in the equation below:

$$F(i) = \frac{\sum_{k=0}^{J_{max}-1} (i_k \times |h_k|^2)}{\sum_{k=0}^{J_{max}-1} ((1-i_k) \times |h_k|^2) + \sigma_z^2 + \sum_{k=0}^{J_{max}-1} (i_k \times \sigma_c^2(k,i))}$$

In the specific implementation described by the above equation, the objective function corresponds to the SNR of the signal processed by the demodulation unit 106. In the numerator, the power values for the different taps included in the channel estimation are added. This value therefore corresponds to the power of the signal used in the demodulation unit 106. The denominator provides an estimate of the total noise and interference power and is made of three separate component terms.

The first term corresponds to the power of the channel taps that are not included in the channel estimation process. Because these channel taps are ignored for the channel estimation, the information associated with them is discarded by the demodulation unit 106 and will result in an increased level of self-interference.

The second term in the numerator of the objective function is power of the noise in the received signal. This term can be calculated as described earlier and does not depend on the set of tap decisions i for which the objective function is calculated.

Finally, the third and last term corresponds to the channel estimation noise. For each tap to be included in the channel estimation, the power of the noise associated with this estimation is calculated and added to the overall channel estimation noise. The term $\sigma_c^2(k,i)$ denotes the power of the channel estimation noise for tap with index k assuming that the taps associated with vector i are included in the channel estimation. The channel estimation noise power for a given tap k and a given state of vector i depends on a number of parameters including the noise power $\sigma_z^2$, the channel estimation method and, when applicable, on the set of training symbols used for channel estimation. It is possible to simplify the implementation of the objective function F by ignoring some of these dependencies and using an approximate value of the channel noise power $\sigma_c^2(k,i)$.

Note that it is possible to modify the objective function F so as to use the estimated channel tap power values $\hat{h}_k$ rather than the true values $h_k$. Note also that the "objective function" approach can easily be extended to include further parameters which may impact the quality of the decisions performed during the demodulation process. For example, the channel estimation unit 405 may also produce an estimate of the DC offset in the received signal. It is then possible to modify the equation defining the objective function F to take into account the noise associated with the estimation of this parameter.

The described approach to deduce the best state for vector i in the channel estimation process leads to a solution that is optimum for the given objective function. The implementation complexity of this scheme can however be high as it requires the estimation of the objective function for all $2^{Jmax}$ possible combinations of channel taps. Hence, a number of techniques aimed at reducing this implementation complexity will now be described.

Figure 7:
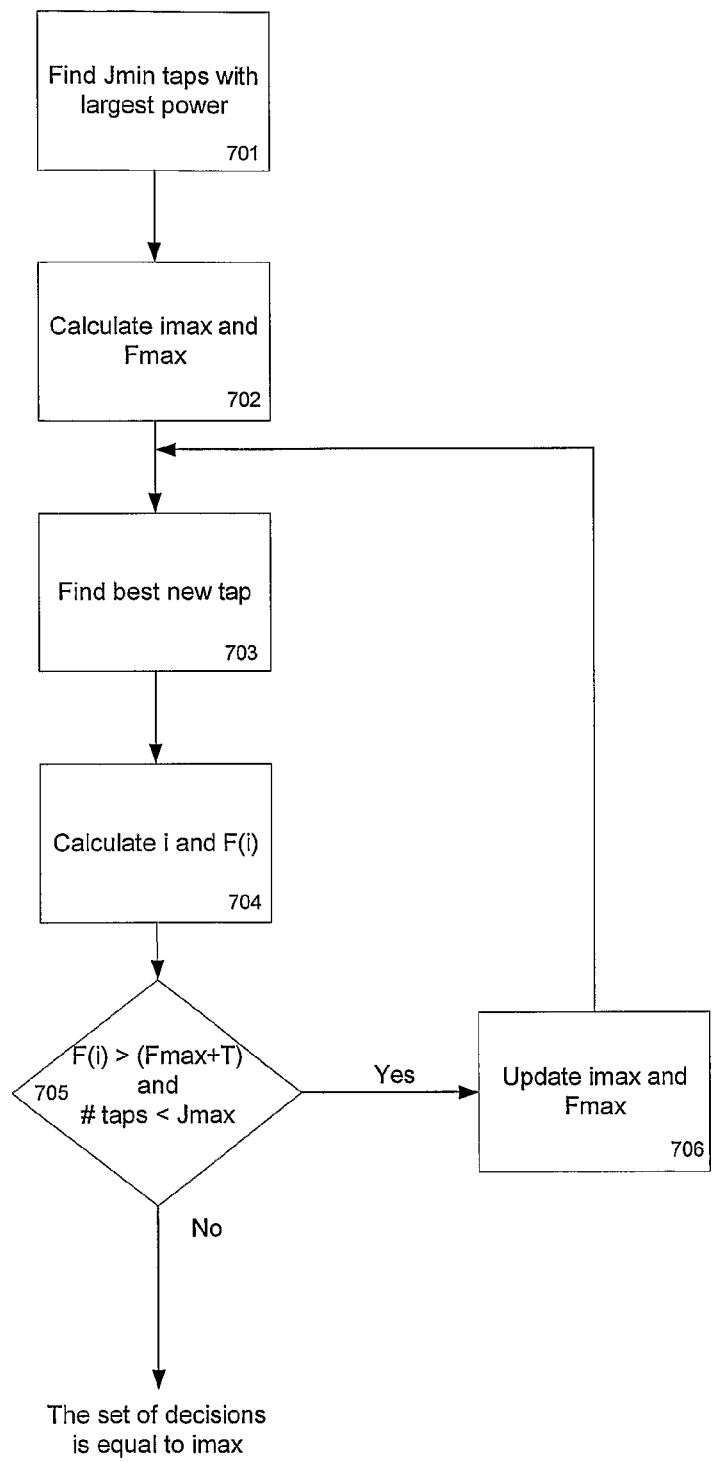
FIG. 7 depicts a flowchart of a reduced complexity implementation of a joint decision approach.

One reduced complexity implementation of the joint decision approach is presented in FIG. 7. In unit 701, the Jmin taps with largest power $|h_k|^2$ are found from the set of Jmax possible taps. In this embodiment, the value of Jmin is a parameter that determines the minimum number of taps to be included in the channel estimation. The value of this parameter can be fixed or can be adapted to the received signal conditions. When the Jmin best taps have been identified, the corresponding tap selection value imax and the associated value of the objective function Fmax=F(imax) are calculated. At this point, imax is set such that the $i_k$ are equal to 1 for, and only for, the Jmin taps with largest power values. The next best tap, i.e. the tap with the next highest power, is then identified in unit 703 from the set of possible taps which have not already been included in the decision imax. A new tap selection value i is then calculated in 704 as well as the corresponding value of the objective function F(i). Assuming that the best new tap corresponds to index m, the value of i is calculated as follows $$i_k = \begin{cases} 1 & \text{if } ((imax_k = 1) \text{ or } (k = m)) \\ 0 & \text{otherwise} \end{cases}$$

A test is then performed in unit 705 to decide if the tap with index m should be included in the final tap decision value imax. If the value of the objective function F(i) is larger than the sum of the objective function for the current best decision imax and a threshold T, the values of imax and Fmax are updated in step 706 to include tap m in the best tap decision set. The computations are then iterated from step 703. However, if the test on the objective function value fails, or if all the possible taps have been processed, the computations come to end and the current value of imax determines which taps should be included in the channel estimation. It should be noted that the value of the threshold T can either be fixed or adapted to the received signal conditions.

Compared to the generic joint decision approach, the implementation described in FIG. 7 is significantly simpler as it requires the objective function to be calculated, in the worst case, for only Jmax decision hypotheses of i rather than the original $2^{Jmax}$. However, this embodiment requires the channel taps to be processed in decreasing order of power. This ordering process can be complex to implement. Moreover, the derived solution may correspond to a set of selected channel taps which are not contiguous. Such a solution will usually lead to higher computational complexity for the channel estimation.

Another variant of the joint approach will now be described. In this variant, the channel taps are not required to be processed in decreasing power order and the solution is guaranteed produce a contiguous set of channel taps. In this implementation, the different possible values J of the channel length are processed. Hence, J will take all the possible values between, and including, Jmin and Jmax. For a given value J of the channel length, the objective function F is calculated for the Jmax−J+1 possible arrangements of contiguous channel taps. Once this processing has been performed for all the possible channel length values J, a set of ((J max+1)×(J max−J min+1))−(((J max×(J max+1))−(J min×(J min−1)))/2) values of the objective function has been generated. The tap arrangement corresponding to the highest value of the objective function is then selected. Two simplifications of this arrangement will now be mentioned.

In order to further reduce the computational complexity of the channel length estimation, it is possible to perform the computations in decreasing order of the channel length J. If the difference between the best value of the objective function for a channel length equal to J and than the best value of the objective function for a channel length equal to J+1 is lower than a threshold T, the channel length is selected to be equal to J+1. The channel tap arrangement corresponding to the best value of the objective function for a channel length equal to J+1 is then used for the channel estimation. Using this approach will usually result in a lower implementation complexity since the computations associated with the channel arrangements for low channel length values can be avoided.

Finally, the complexity associated with the repetition of the calculation of the objective function can be further reduced by forcing the hypotheses for vector i to always include the first tap. In this implementation, the number of evaluations of the objective function for a given channel length J is reduced from Jmax−J+1 down to only 1.

The invention claimed is:

1. Apparatus for estimating, for a wireless signal acquired by a receiver, a channel response estimate having a set of potential tap positions, the apparatus comprising
   a measurement circuit to calculate signal significance values for said wireless signal for all tap positions in said set of potential tap positions,
   a decision circuit arranged to use the signal significance values produced by the measurement circuit to determine if any of said tap positions in said set of potential tap positions should not be used to calculate the channel response estimate and
   an estimation circuit to calculate the channel response estimate using said set of potential tap positions less any tap positions excluded by the decision unit,
   wherein the decision unit is further arranged to, for one or more of the tap positions in said set of potential tap positions, combine several of the signal significance values that correspond to the same tap position by filtering,
   wherein the calculated signal significance values are measured by an average power of the wireless signal at all the tap positions in said set of potential tap positions.

2. Apparatus according to claim 1, wherein the decision circuit is arranged to compare each of the calculated signal significance values, for each respective tap position in said set of potential tap positions, with a threshold in order to determine which tap positions to exclude from the channel response estimation.

3. Apparatus according to claim 1, wherein
   the measuring circuit is arranged to use the signal significance values to calculate signal to noise ratios for all of the tap positions in said set of potential tap positions and
   the decision circuit is arranged to exclude from the channel response estimation any tap position whose signal to noise ratio falls below a threshold.

4. Apparatus according to claim 1, wherein the wireless signal includes a known sequence and the measurement circuit is arranged to correlate a copy of the known sequence against the wireless signal at various offsets to deduce signal significance values for different tap positions in said set of potential tap positions.

5. Apparatus according to claim 1, wherein significant signals and insignificant signals are obtained according to the calculated signal significance values measured in a signal power in a given tap position of the set of potential tap positions, and
the decision circuit excludes all tap positions of the set of potential tap positions that contain insignificant signal.

6. Apparatus for estimating, for a wireless signal acquired by a receiver, a channel response estimate having a set of potential tap positions, wherein the set of potential tap positions are treated as a vector and the apparatus comprises
a decision circuit to deduce a state of the vector that produces an acceptable value of an objective function having the vector as a parameter and
a calculating circuit to calculate the channel response estimate using those of the set of potential tap positions that are specified by the deduced state,
wherein the decision circuit is arranged to calculate signal significance values for said wireless signal for tap positions in said set of potential tap positions and to, for one or more of the potential tap positions, combine several of the calculated signal significance values that correspond to the same tap position by filtering,
wherein the calculated signal significance values are measured by an average power of the wireless signal at all the tap positions in said set of potential tap positions.

7. Apparatus according to claim 6, wherein the decision circuit is arranged to configure the vector as having only a number of taps with the highest signal significance values as active taps, to reconfigure the vector to additionally have the tap with the next highest signal significance as active and to determine if the reconfiguration of the vector improves the value of the objective function.

8. Apparatus according to claim 7, wherein the decision circuit is arranged to calculate values of the objective function only for states of the vector in which the active taps are contiguous and to select, from the states of the vector, a state that provides the best value of the objective function.

9. Apparatus according to claim 8, wherein the decision circuit is only to proceed to objective function evaluation for states with a number m of active taps if: a. the objective function value(s) for the state(s) having m−1 active traps does not or does not better, according to a given criterion, the objective function value(s) for the state(s) having m−2 active taps; or b. there are no states with m−2 or m−1 active taps.

10. Apparatus according to claim 6, wherein the objective function is a representation of the signal to noise ratio of said wireless signal.

11. Apparatus according to claim 6, wherein significant signals and insignificant signals are obtained according to the calculated signal significance values measured in a signal power in a given tap position of the set of potential tap positions, and the decision circuit excludes all tap positions of the set of potential tap positions that contain insignificant signal.

12. A method of estimating, for a wireless signal acquired by a receiver, a channel response estimate having a set of potential tap positions, the method comprising
a measurement step of calculating signal significance values for said wireless signal for all tap positions in said set of potential tap positions,
a selecting step arranged to use the calculated signal significance values produced by the measurement step to determine if any of said tap positions should not be used to calculate the channel response estimate and
an estimation step of calculating the channel response estimate using said set of potential tap positions less any tap positions excluded by the selecting step,
wherein the selecting step is arranged to, for one or more of the tap positions in said set of potential tap positions, combine several of the calculated signal significance values that correspond to the same tap position by filtering,
wherein the calculated signal significance values are measured by an average power of the wireless signal at all the tap positions in said set of potential tap positions.

13. A method according to claim 12, wherein the selecting step is arranged to compare each of the calculated signal significance values, for each respective tap position in said set of potential tap positions, with a threshold in order to determine which tap positions to exclude from the channel response estimation.

14. A method according to claim 12, wherein
the measuring step is arranged to use the signal significance values to calculate signal to noise ratios for all of the tap positions in said set of potential tap positions and
the selecting step is arranged to exclude from the channel response estimation any tap position whose signal to noise ratio falls below a threshold.

15. A method according to claim 12, wherein the wireless signal includes a known sequence and
the measurement step is arranged to correlate a copy of the known sequence against the wireless signal at various offsets to deduce signal significance values for different tap positions.

16. A method according to claim 12, wherein significant signals and insignificant signals are obtained according to the calculated signal significance values measured in a signal power in a given tap position of the set of potential tap positions, and the selecting step excludes all tap positions of the set of potential tap positions that contain insignificant signal.

17. A method of estimating, for a wireless signal acquired by a receiver, a channel response estimate having a set of potential tap positions, wherein the set of potential tap positions are treated as a vector and the method comprises
a step of deducing a state of the vector that produces an acceptable value of an objective function having the vector as a parameter and
a step of calculating the channel response estimate using those of the set of potential tap positions that are specified by the deduced state,
wherein the step of calculating is arranged to calculate signal significance values for said wireless signal for tap positions in said set of potential tap positions and to, for one or more of the set of potential tap positions, combine several of the calculated signal significance values that correspond the same tap position by filtering,
wherein the calculated signal significance values are measured by an average power of the wireless signal at all the tap positions in said set of potential tap positions.

18. A method according to claim 17, wherein the deducing step is arranged to configure the vector as having only a number of taps with the highest signal significance values as active taps, to reconfigure the vector to additionally have the tap with the next highest signal significance as active and to determine if the reconfiguration of the vector improves the value of the objective function.

19. A method according to claim 18, wherein the deducing step is arranged to calculate values of the objective function only for states of the vector in which the active taps are contiguous and to select, from the states of the vector, a state that provides the best value of the objective function.

20. A method according to claim 19, wherein the deducing step is only to proceed to objective function evaluation for states with a number m of active taps if: b. the objective function value(s) for the state(s) having m−1 active taps does not or do not better, according to a given criterion, the objective function value(s) for the state(s) having m−2 active taps; or c. there are no states m−2 or m−1 active taps.

21. A method according to claim 17, wherein the objective function is a representation of the signal to noise ratio of said wireless signal.

22. A method according to claim 17, wherein significant signals and insignificant signals are obtained according to the calculated signal significance values measured in a signal power in a given tap position of the set of potential tap positions, and the step of deducing excludes all tap positions of the set of potential tap positions that contain insignificant signal.

23. A non-transitory computer readable medium encoded with a computer program that causes a computer to implement a method of estimating, for a wireless signal acquired by a receiver, a channel response estimate, having a set of potential tap positions, the method comprising a measurement step of calculating signal significance values for said wireless signal for all tap positions in said set of potential tap positions, a selecting step arranged to use the calculated signal significance values produced by the measurement step to determine if any of said tap positions should not be used to calculate the channel response estimate and an estimation step of calculating the channel response estimate using said set of potential tap positions less any tap positions excluded by the selecting step, wherein the selecting step is arranged to, for one or more of the tap positions in said set of potential tap positions, combine several of the calculated signal significance values that correspond to the same tap position by filtering, wherein the calculated signal significance values are measured by an average power of the wireless signal at all the tap positions in said set of potential tap positions.

24. A non-transitory computer readable medium encoded with a computer program that causes a computer to implement a method of estimating, for a wireless signal acquired by a receiver, a channel response estimate having a set of potential tap positions, wherein the set of potential tap positions are treated as a vector and the method comprises a step of deducing a state of the vector that produces an acceptable value of an objective function having the vector as a parameter and a step of calculating the channel response estimate using those of the set of potential tap positions that are specified by the deduced state, wherein the step of calculating is arranged to calculate signal significance values for said wireless signal for tap positions in said set of potential tap positions and to, for one or more of the set of potential tap positions, combine several of the calculated signal significance values that correspond to the same tap position by filtering, wherein the calculated signal significance values are measured by an average power of the wireless signal at the tap positions in said set of potential tap positions.

* * * * *